United States Patent Office.

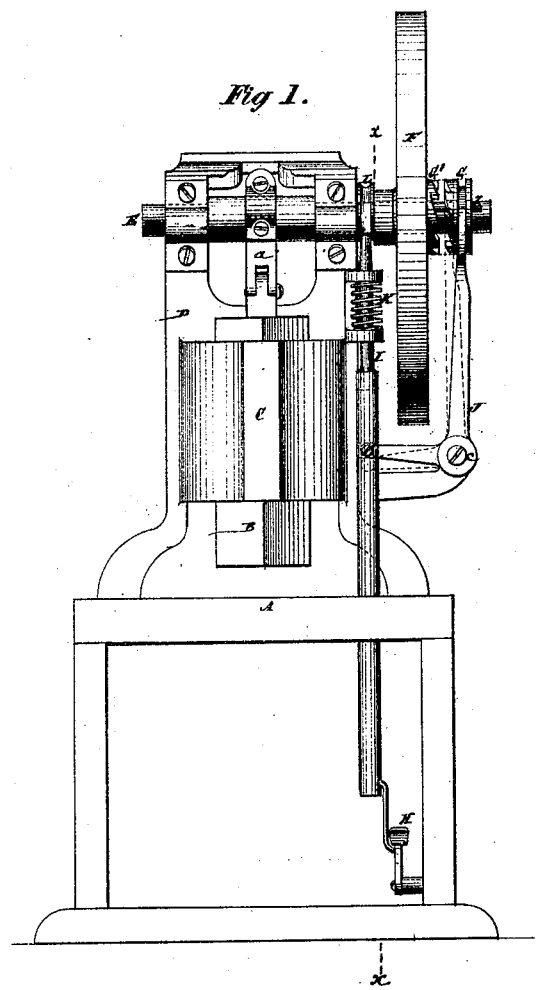
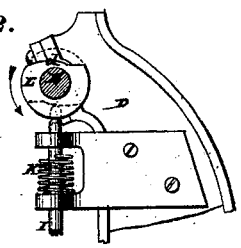

ALBERT HAMLIN, OF BROOKLYN, NEW YORK, ASSIGNOR TO MAYS & BLISS, OF SAME PLACE.

Letters Patent No. 107,363, dated September 13, 1870; antedated September 5, 1870.

IMPROVED TRIP MOTION FOR PRESSES, &c.

The Schedule referred to in these Letters Patent and making part of the same

*To all whom it may concern:*

Be it known that I, ALBERT HAMLIN, of Brooklyn, in the county of Kings and State of New York, have invented a new and useful Improvement in Trip Motions for Presses, of which the following is a full, clear, and exact description, reference being had to the accompanying drawing forming part of this specification, and in which—

Figure 1 represents a front view of a power-press, having my improvement applied to it, and Figure 2, a side view or section of the trip motion in part, taken as indicated by the line $x$ in fig. 1.

Similar letters of reference indicate corresponding parts.

My invention relates to trip motions for power-presses, in which, without stopping the driving-shaft, or operating wheel, the plunger, in being arrested by the trip motion, is stopped at the top of its stroke, to facilitate access to the dies and operating bed portion of the press; and My improvement consists in a novel and advantageous combination of means for such purpose.

In the accompanying drawing—

A represents the bed of the press, in or on which is arranged the lower die.

B is the plunger, carrying the upper die, and arranged to slide vertically within or through a guide-box, C, connected with the frame D of the press.

Said plunger is operated by an eccentric on an upper horizontal shaft, E, through a connecting-rod or link, $a$, or it may receive its motion from the driving-shaft E by any other means.

F is the driving-pulley of the shaft E, which pulley is arranged to run loose on said shaft, and, when required to drive, it is geared therewith through the intervention of a sliding clutch, G, made to fit a feather, $b$, on the shaft and gearing, when slid toward the press with a clutch, G', fast to the loose driving-pulley F.

The pulley F also serves as a fly-wheel to the press, and, being weighty, it is desirable, to prevent side heft and secure steadiness, to get it as close to the main frame as practicable; hence the clutches G G' are arranged on the off or outer side of said pulley, and the trip motion, by its peculiar construction or arrangement of parts, favors such close disposition of the driving-pulley to the main frame.

The trip motion is constructed as follows:

H is a treadle, arranged below the bed of the press, and serving, when depressed and held down by the foot, to bear down a vertically-sliding and suitably-guided rod, I, which causes a bell-crank lever, J, to slide and retain the clutch G in gear with the clutch G', said bell-crank lever J having its fulcrum, as at $c$, on a bracket branching from the main frame, and being connected at its ends with the rod I and sliding clutch G. When pressure is released from the treadle H the rod I is lifted by a spring, K, attached to it, and the bell-crank lever made to slide back the clutch G out of gear with the clutch G', and, consequently, motion of the press is arrested, although the driving-pulley F keeps running.

To secure the press stopping only when the plunger is raised, without reference to the period, in the stroke of said plunger, of releasing pressure from the treadle to arrest the press, the rod I is made to bear or project into close contact at its top against a cam, L, fast on the driving-shaft inside of the pulley, which cam is of a shape, for the greater portion of its periphery, to prevent the rod I from rising when pressure is removed from the treadle, and the spring K bears it upward, but which cam has a reduction, as at $d$, on a portion of its periphery, so that, on said reduction coming round, the rod I is shot by the spring K up to or against it, and the clutch G, of a necessity, ungeared from the pulley or clutch G', thereon, and the press thereby arrested in its motion.

This reduction $d$ is of a suitable shape, to prevent any catching of the rod I, and to allow of its free release, and is so timed or arranged in relation to the plunger B as only to come round over the rod I when the plunger is at the top of its stroke, hence; no matter when the foot is released from the treadle to stop the press, such stoppage cannot take place before the plunger has made its up-stroke, which affords every facility for getting at the dies.

A weight may be substituted to act in the place of the spring K, and any suitable connecting device be used instead of the bell-crank lever J.

What is here claimed, and desired to be secured by Letters Patent, is—

The combination and arrangement relatively, to the plunger B, of the cam L, formed with a reduction, $d$, on its periphery, the rod I, lever J and spring K, loose driving-pulley F, on the operating shaft E, and the clutches G G', substantially as specified.

ALBERT HAMLIN.

Witnesses:
FRED. HAYNES,
HENRY PALMER.